(12) United States Patent
Do et al.

(10) Patent No.: US 6,266,196 B1
(45) Date of Patent: Jul. 24, 2001

(54) MULTI-POSITION OPTIC MOUNT

(75) Inventors: Khiem Do, Sunnyvale; David F. Arnone, Mountain View, both of CA (US)

(73) Assignee: New Focus, Inc., Santa Clara, CA (US)

( * ) Notice: Subject to any disclaimer, the term of this patent is extended or adjusted under 35 U.S.C. 154(b) by 0 days.

(21) Appl. No.: 09/443,950

(22) Filed: Nov. 19, 1999

(51) Int. Cl.[7] .................................................. G02B 7/02
(52) U.S. Cl. ........................ 359/819; 359/822; 359/813
(58) Field of Search .................................. 359/811, 813, 359/817, 819, 822, 823, 828, 830; 362/455; 396/342; 354/286; 356/345, 354

(56) References Cited

U.S. PATENT DOCUMENTS

| | | | |
|---|---|---|---|
| 5,194,993 | * | 3/1993 | Bedzyk ................................ 359/813 |
| 5,731,918 | * | 3/1998 | Parr-Burman et al. .............. 359/823 |
| 5,737,132 | | 4/1998 | Luecke et al. ....................... 359/819 |
| 5,847,885 | * | 12/1998 | Arnone et al. ....................... 359/818 |
| 5,852,519 | | 12/1998 | Do et al. ............................. 359/822 |
| 5,936,785 | * | 8/1999 | Do et al. ............................. 359/822 |
| 5,953,164 | | 9/1999 | Arnone et al. ....................... 359/819 |
| 6,144,506 | * | 11/2000 | Holdener et al. .................... 359/812 |

* cited by examiner

*Primary Examiner*—Georgia Epps
*Assistant Examiner*—Saeed Seyrafi
(74) *Attorney, Agent, or Firm*—Cary & Kelly, LLP; Charles C. Cary

(57) ABSTRACT

A multi-position optic mount is disclosed which provides for automatic movement of an optic element between an engaged position, in which the optic element intersects an optical path, and a disengaged position, in which the optic element avoids an optical path. The optic mount may be used for a broad range of optical elements including: lenses, filters, etalons, gratings, retroreflectors, wave guides, fiber optics, lasers, photo-detectors, etc. A unique activation capability is provided in which an active actuator and passive actuator are utilized to move the mount between the engaged and disengaged positions.

23 Claims, 6 Drawing Sheets

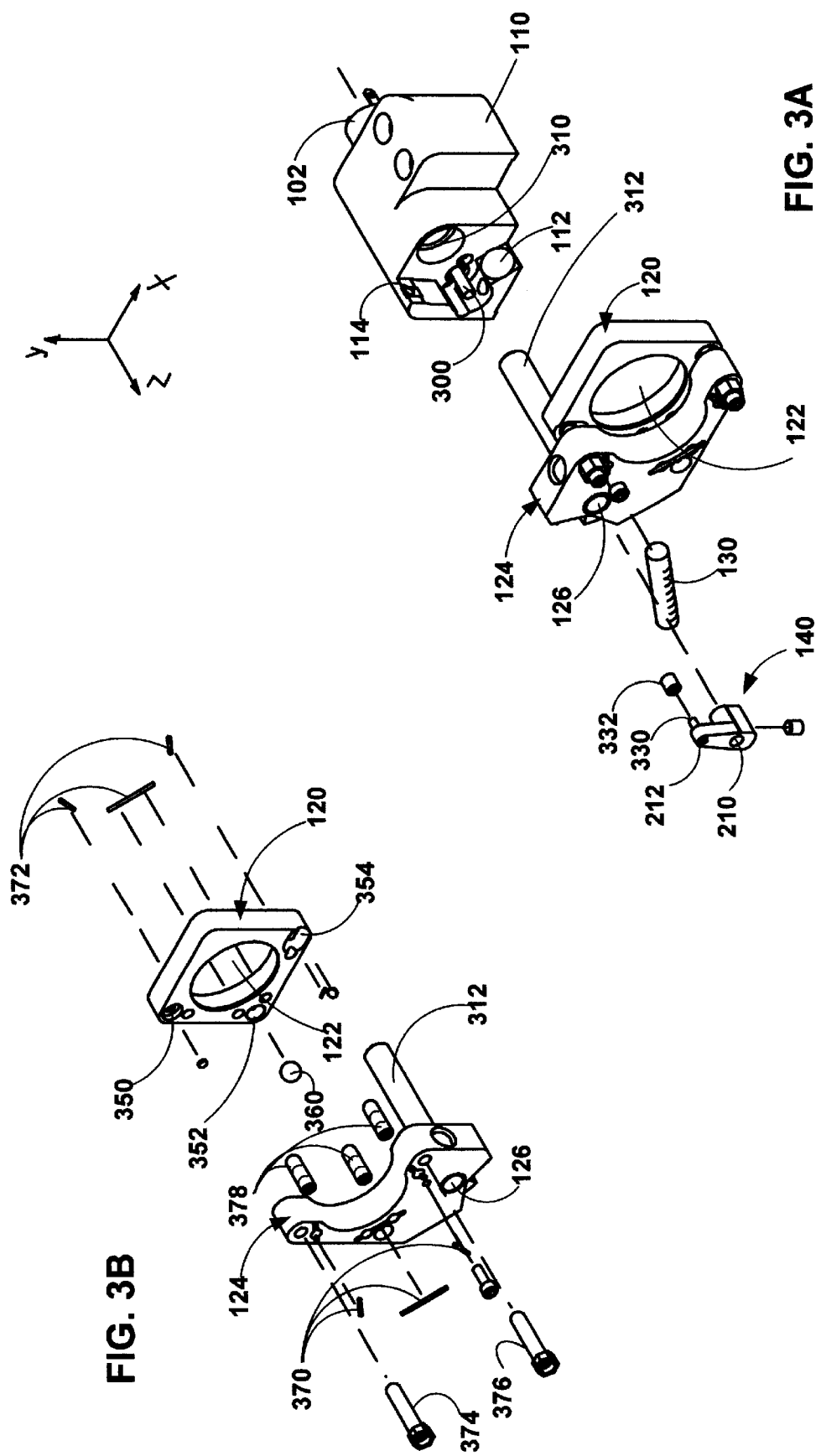

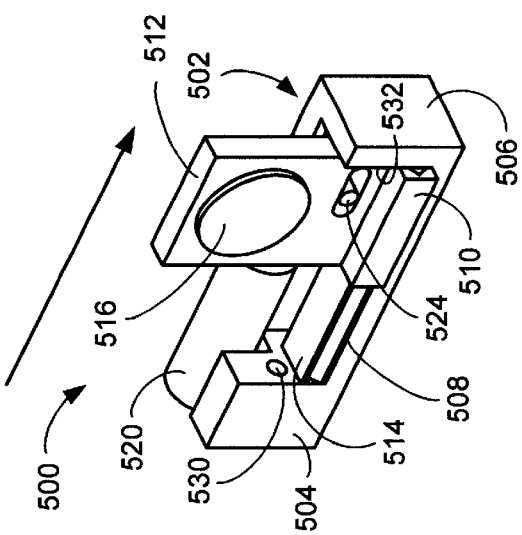
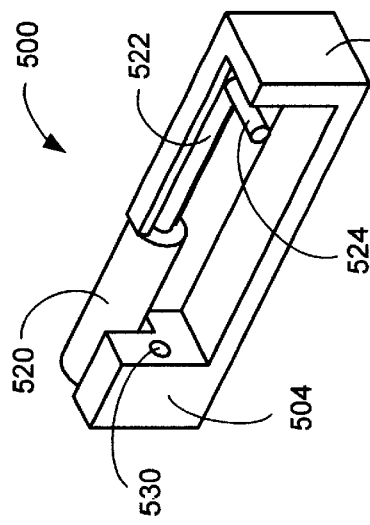
FIG. 5D
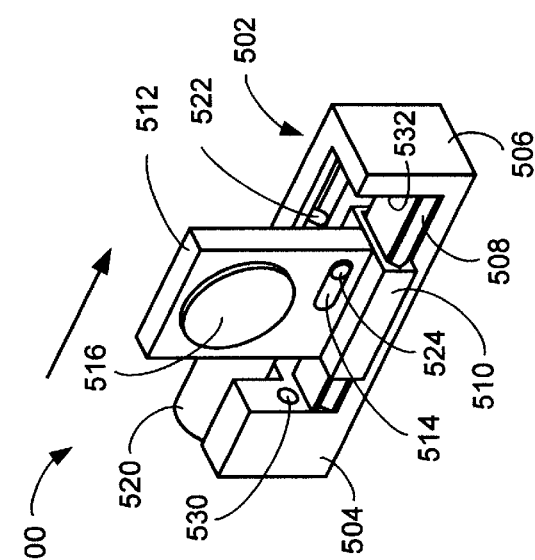
FIG. 5C
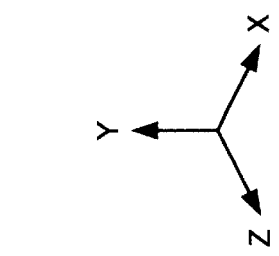
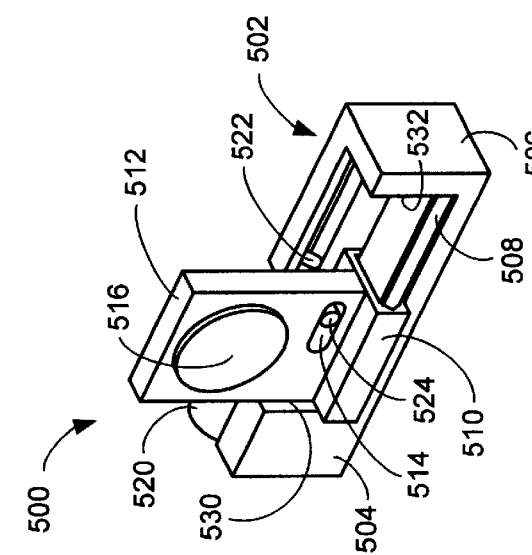
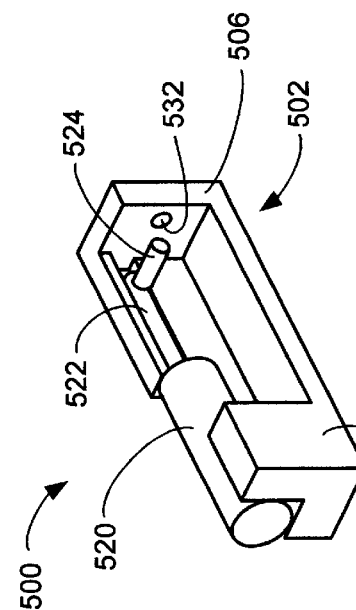
FIG. 5E

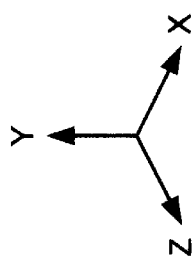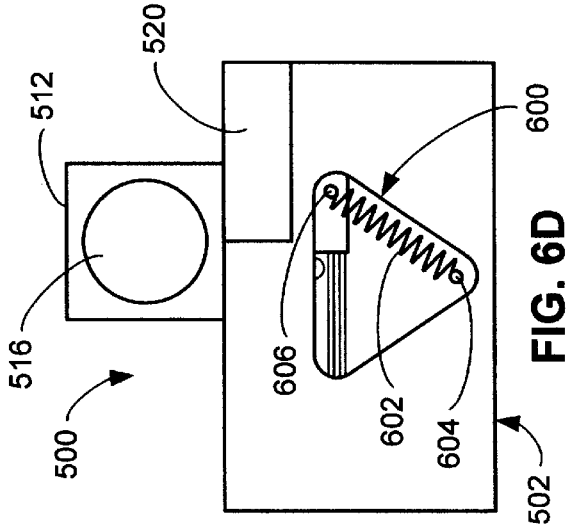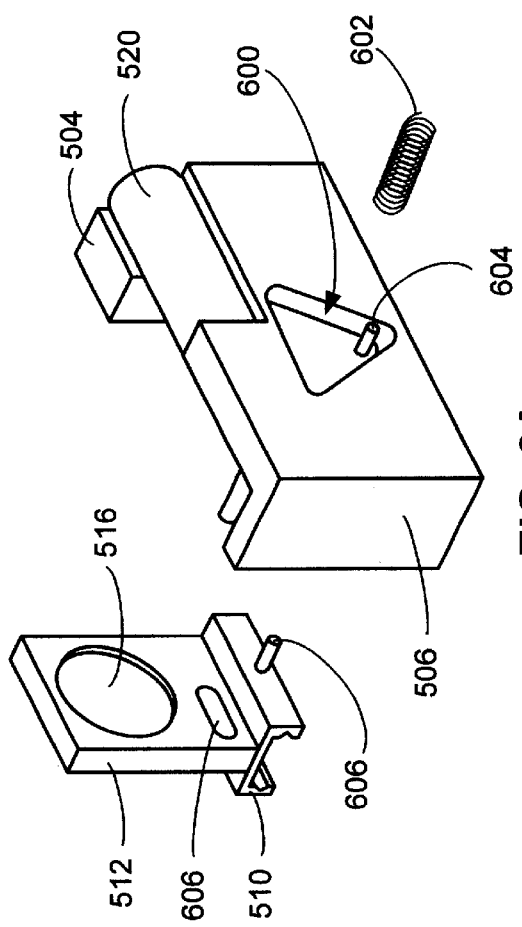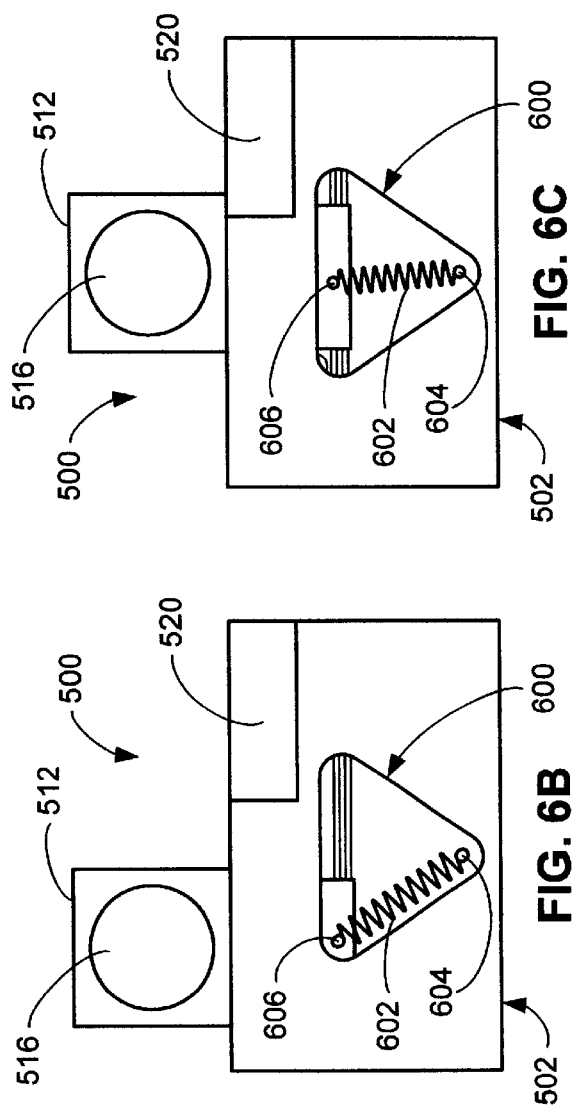

MULTI-POSITION OPTIC MOUNT

BACKGROUND OF THE INVENTION

1. Field of Invention

The present invention relates to mounting devices for optical systems, such as those constructed on an optical bench, and more particularly to a multi-position optic mount that may be used to precisely position an optic element to intersect or to avoid intersection with an optical path.

2. Description of the Related Art

In the field of test and measurement as well as experimental optics, it is customary to position the various optical elements on an optical bench, which is quite commonly a massive block of rigid material supported by a shock absorbing mount.

Typically a laser beam will be modified by several optical elements in series or in various combinations. These optical elements include: filters, mirrors, lenses, retroreflectors, wave guides, etalon, detectors, emitters, etc. To perform these modifications it is desirable to have an optical mount that can repeatedly and precisely reposition elements to intersect and avoid intersection with the optical beam.

In the case where comparisons between systems are to be made, it is highly desirable that both systems be driven by the same laser source. The use of a single laser to feed several different systems may also be desirable for other reasons, such as the reduction in cost afforded by the use of one laser instead of two. The switching from one system to another is best accomplished by the use of a mirror positioned in the optical path close to the laser source. The problem with using a removable mirror is that the mirror must be accurately positioned each time it is replaced in the optical path. The realignment of the mirror can be a time consuming task since it must be very accurately positioned.

What is needed is an optic mount with a small form factor and low cost which exhibits high precision during the repeated repositioning of optic elements.

SUMMARY OF THE INVENTION

A multi-position optic mount is disclosed which provides for automatic movement of an optic element between an engaged position in which the optic element intersects an optical path, and a disengaged position in which the optic element avoids an optical path. The optic mount may be used for a broad range of optical elements including: lenses, filters, etalons, gratings, retroreflectors, wave guides, fiber optics, lasers, photo-detectors, etc. A unique activation capability is provided in which an active actuator and passive actuator are utilized to move the mount between the engaged and disengaged positions.

In an embodiment of the invention a mount for positioning an optic element in at least a first and a second position is disclosed. The mount includes: a base, a movable stage, an active actuator, and a passive actuator. The movable stage holds the optic element. The movable stage couples to the base. The movable stage is positionable in at least a first and a second position. The active actuator couples to the movable stage to move the movable stage from the first position toward the second position and from the second position toward the first position. The passive actuator completes the movement of the movable stage to the corresponding one of the first position and the second position.

In an alternate embodiment of the invention a mount for positioning an optic element in at least a first and a second position is disclosed. The mount includes: a base, a movable stage, an active actuator, and a passive actuator. The movable stage holds the optic element. The movable stage couples to the base. The movable stage is positionable in a least a first and a second position. The active actuator couples to the movable stage to move the movable stage from the first position toward the second position and from the second position toward the first position. The passive actuator completes the movement of the movable stage to the corresponding one of the first position and the second position by generating regions of low potential energy for the movable stage at the first and second position and a region of high potential energy intermediate the first and second position.

In an alternate embodiment of the invention a mount for positioning an optic element in at least a first and a second position is disclosed. The mount includes: a base, a means for holding the optic element, an active activation means, and a passive activation means. The means for holding the optic element couples to the base and is positionable in at least a first and a second position. The active activation means couples to the means for holding to move the means for holding from the first position toward the second position and from the second position toward the first position. The passive activation means completes the movement of the means for holding to the corresponding one of the first position and the second position.

In an alternate embodiment of the invention a mount for positioning an optic element in at least a first and a second position is disclosed. The mount includes: a base, a means for holding the optic element, an active activation means, and a passive activation means. The means for holding the optic element couples to the base and is positionable in at least a first and a second position. The active activation means couples to the means for holding to move the means for holding from the first position toward the second position and from the second position toward the first position. The passive activation means completes the movement of the means for holding to the corresponding one of the first position and the second position by generating regions of low potential energy for the means for holding at the first and second position and a region of high potential energy intermediate the first and second position.

BRIEF DESCRIPTION OF THE DRAWINGS

These and other features and advantages of the present invention will become more apparent to those skilled in the art from the following detailed description in conjunction with the appended drawings in which:

FIG. 3A is an exploded isometric top side view of the multi-position optic mount shown in FIG. 1B.

FIG. 3B is an enlarged exploded top side view of the kinematic mount shown in FIG. 3A.

FIGS. 5A–C are isometric top side views of a linear embodiment of the multiposition optic mount showing movement of the optic element between the engaged position and the disengaged position.

FIGS. 5D–E are isometric top side views of the linear multi-position optic mount shown in FIGS. 5A–C with the movable stage removed and showing the active and passive actuators.

FIG. 6A is an exploded isometric top side view of another linear embodiment of the multi-position optic mount.

FIGS. 6B–D are isometric top side views of the linear embodiment of the multi-position optic mount of FIG. 6A, showing movement of the optic element between the disengaged position and the engaged position.

DETAILED DESCRIPTION OF THE EMBODIMENTS

A multi-position optic mount is disclosed which provides for automatic movement of an optic element between an engaged position in which the optic element intersects an optical path, and a disengaged position in which the optic element avoids an optical path. The optic mount may be used for a broad range of optical elements including: lenses, filters, etalons, gratings, retroreflectors, wave guides, fiber optics, lasers, photo-detectors, etc. A unique activation capability is provided in which an active actuator and passive actuator are utilized to move the mount between the engaged and disengaged positions.

Figures 1A, 1B:
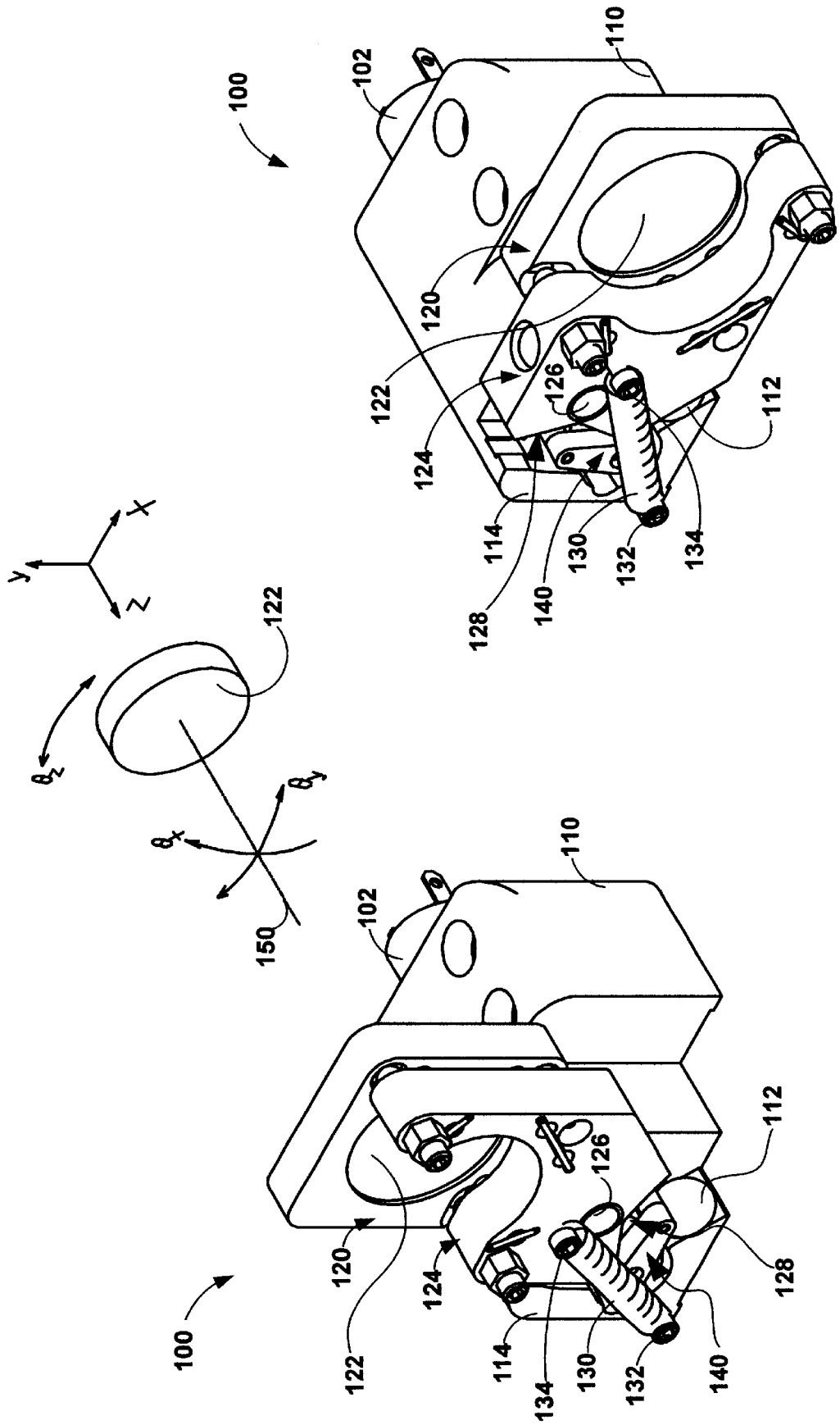
FIGS. 1A–B are isometric top side views of a multi-position optic mount in the engaged and disengaged positions respectively.

FIGS. 1A–B are isometric top side views of the multi-position optic mount 100 in the engaged and disengaged positions respectively. In the engaged position an optic element, e.g., lens, is positioned to intersect the optical path 150. In the disengaged position it avoids the optical path. In this embodiment the engaged and disengaged positions are arcuately separated by approximately 90°. The optic device 100 includes: a housing 110, motor 102, spring 130, cam 140, and kinematic stages 124,120. The kinematic stages include a pivot stage 124 and a clamp stage 120. The pivot stage is pivotally coupled to the housing 110 at opening 126. The clamp stage 120 defines an opening for holding an optic 122. The clamp stage is kinematically coupled to the pivot stage (See FIG. 3B) and thus pivots with it.

The limits of the arcuate motion of the pivot stage are defined by stops 114 and 112 which are part of the front portion of the housing. Stop 114 contacts the pivot stage at the limit of its counter-clockwise rotation, thus positioning the lens 122 in the engaged position. Stop 112 contacts the pivot stage at the limit of its clockwise rotation, thus positioning the lens in the disengaged position.

The initial force required to move the pivot stage in either a counter-clockwise or clockwise direction is provided by the movement of cam 140 which is coupled to the output shaft of motor 102. As the cam rotates, its tip engages a mating member, e.g., an interior surface of a concave opening 128 defined in the pivot stage below the pivot opening 126. The engagement of the cam with the mating member is similar to that of two gears meshing with one another. Thus, as the cam rotates counter-clockwise, it causes the pivot stage to rotate clockwise and vice-versa. Now, the motion of the cam alone does not account for the preferred positioning of the pivot stage against one or the other of stops 112–114. In fact, the cam disengages from the contact surface of the mating member, e.g., concave opening, once the pivot stage has passed beyond the midpoint of its travel. After the cam disengages, the motor actuator is de-energized. De-energization may result from a switch, an encoder or the monitoring of an electrical parameter such as current or voltage. In this latter instance, a sensor monitors the electrical parameter and de-energizes the motor when that parameter exceeds a threshold level.

The final positioning of the pivot stage against either stop is achieved by means of an overcenter arrangement of an extension spring 130. That spring anchors on a proximal end to the housing, and extends radially over and beyond the pivot point 126 to a distal anchor point on the pivot stage. The anchor points for an extension spring lie on either side of the pivot point, with the proximal anchor point on the housing and the distal anchor point on the side of the pivot point furthest from the proximal anchor point. In an alternate embodiment of the invention a compression spring is utilized instead. In that embodiment of the invention the proximal anchor point for the compression spring is to the housing. The distal anchor point lies between, rather than beyond, the pivot point and the proximal anchor point.

In either embodiment, as the pivot stage rotates the spring, expansion or compression reaches a maximum potential energy at an intermediate point between the engaged and disengaged positions of the kinematic stage. On either side of the center the potential energy of the spring decreases, thus providing the necessary kinetic energy to bias the pivot stage into contact with whichever of the stops 112–114 lies beyond the center point in the rotational direction established by the cam.

Thus the multi-position optic mount moves between the engaged and the disengaged position using both active and passive actuators. The active actuator, e.g., motor and cam, initiates movement from a stop to the midpoint between stops. The passive actuator, e.g., spring, completes the movement of the pivot stage by drawing it into contact with the stop. Expressed in physical terms, the passive actuator creates for the pivot stage two regions of low potential energy bordering an intermediate region of high potential energy. The active actuator moves the pivot stage across the intermediate region of high potential energy toward whichever of the low potential energy regions is desired. The dimensional limit of the low potential energy region is determined by the mechanical stops 112–114.

The cam and mating member, e.g., concave opening, may be designed to vary the acceleration of the pivot stage as it moves from one stop across the midpoint of its arcuate travel. The geometry of the cam and mating member may be reversed, with the cam comprising two teeth between which a concave opening is defined, and with a single tooth protruding from and defined in the pivot stage to mate with the concave opening. The two phases of positioning, i.e., the active phase initiated by the active actuator, e.g., motor and cam; followed by the passive phase initiated by the passive actuator, e.g., spring has numerous advantages as opposed to positioning by the motor alone. First, the motor need not be energized in order to fix the pivot stage into contact with either stop 112 or 114. The spring passively provides the force to maintain the contact between the pivot stage and the stops at either extreme of travel. Second, the disengagement of the cam and concave opening prior to reaching either limit of travel, i.e., stops 112–114, assures that the spring force alone will produce the final movement of the pivot stage to the stop. This reduces the impact of the pivot stage on the stops, thus reducing shock, wear and tear on the system, as well as on the optical element. Because shock is minimized, critical alignments can be maintained across many cycles of the kinematic stage between the engaged and disengaged positions.

Figure 2B:
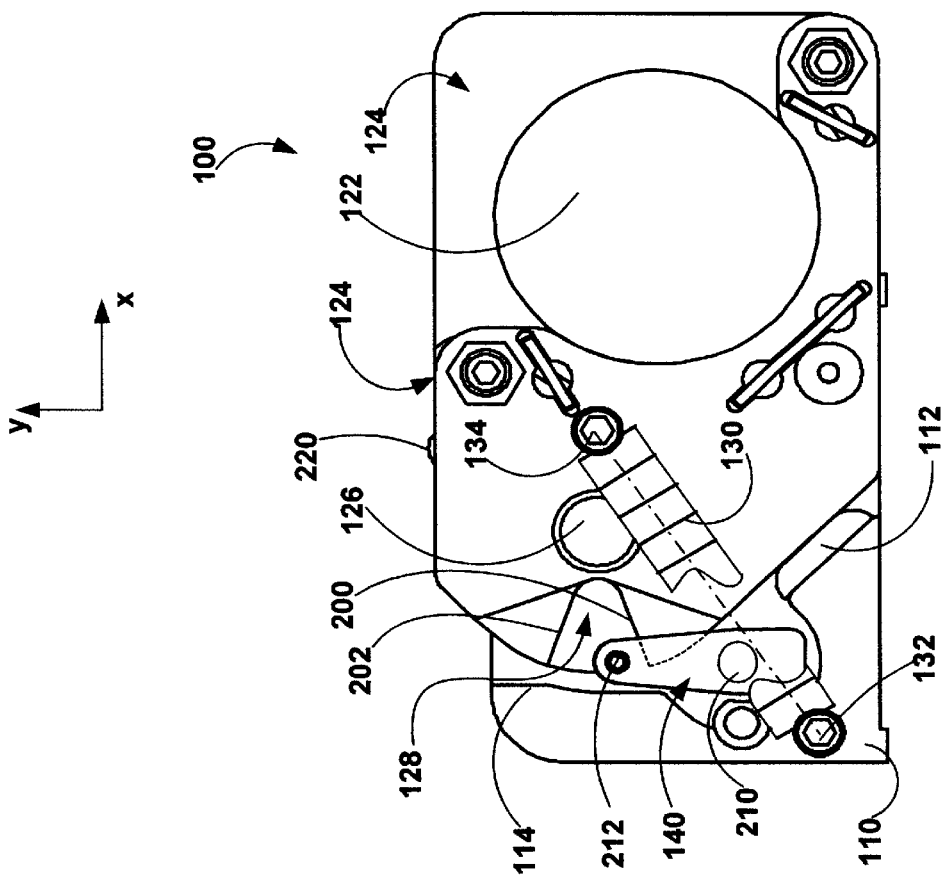
FIGS. 2A–B are front views of the multi-position optic mount shown in FIGS. 1A–B respectively.
Figure 2A:
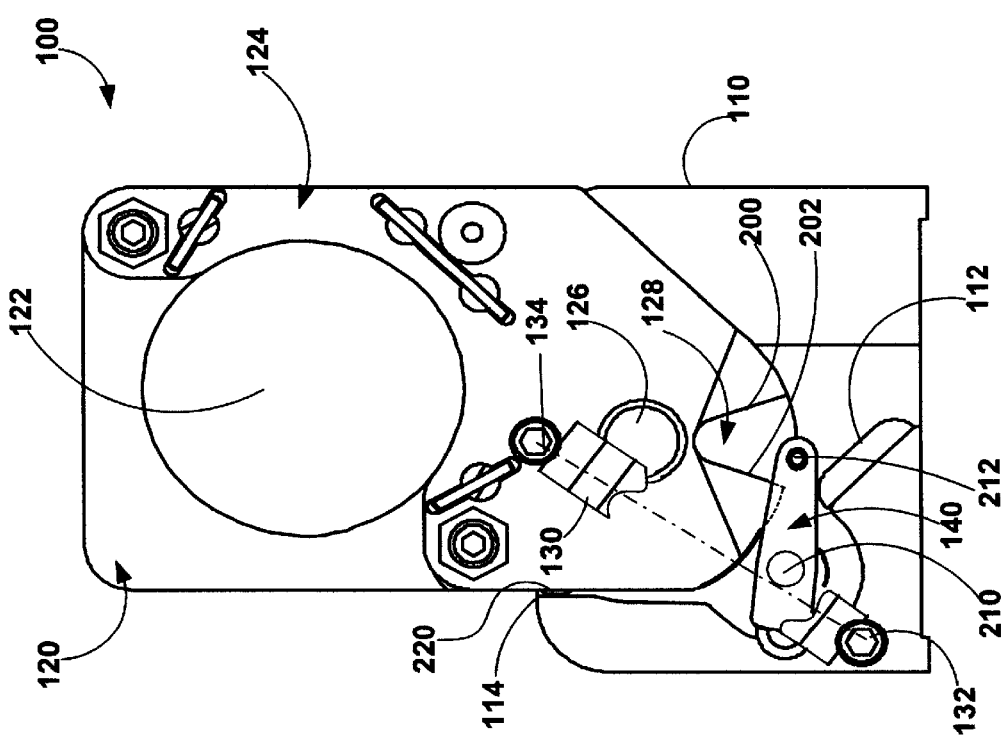

FIGS. 2A–B are front views of the multi-position optic mount 100 shown in FIGS. 1A–B respectively. The pivot stage 124, the kinematic stage 120, the housing 110, cam 140, and spring 130 are shown. The stops 112 and 114 are defined in an extension of the housing that surrounds the lower portion of the pivot stage. In FIG. 2A the optic element, e.g., lens 122, is shown in the engaged position, lined up so as to intersect the optic axis 150 (See FIG. 1A) and with a hard polished tungsten carbide ball 220 protruding from the pivot stage in contact with stop 114. In this embodiment of the invention which includes the ball, both the hardness and surface quality of the ball are utilized to assure repeatable performance. In FIG. 2B the optic element is in the disengaged position with the pivot stage in contact with stop 112. In an embodiment of the invention stop 112 includes an elastomeric material to cushion the impact of the pivot stage.

The extension spring 130 has its proximal end anchored to the housing at location 132 and its distal end anchored to the pivot stage at location 134 which lies on the side of the pivot point 126 furthest from the proximal end of the spring. The extension spring is at a minimum energy potential and its shortest length in the orientations shown in FIGS. 2A–B. Intermediate those orientations, i.e., the engaged and disengaged positions, the spring moves through a maximum of potential energy when it is stretched to its greatest length, thereby making the center/intermediate position energetically unstable.

The concave opening 128 defined in a lower portion of the pivot stage includes generally opposing surfaces 200 and 202. These surfaces may be covered with an elastomeric material to reduce the shock of contact between the concave surface and a contact pin 212 at the tip of cam 140. The portion of the spring 130 which obscures the pivot hole 210 for the cam has been removed to show that pivot point. To move the pivot stage from the engaged to the disengaged position, the cam tip 212 makes initial contact with surface 202 of the concave opening and in so doing moves the pivot stage up to and just beyond the intermediate point of its arcuate travel, i.e., just beyond the point of maximum extension of spring 130. Then the tip of the cam disengages from surface 202. Depending on geometry, after a brief transition, it may then contact the opposing surface 200 of the concave opening as that surface is drawn into contact with the cam tip 212 by the spring 130, thereby slowing the spring induced motion of the pivot stage toward stop 112, until at the extreme of its arcuate travel the cam is disengaged from both surfaces 200–202 as shown in FIG. 2B and the spring brings the pivot stage to rest against stop 112. Alternately, the geometry may be such that the cam makes no contact with surface 200, thereby avoiding any role in governing the rate at which the pivot stage is drawn by spring 130 into contact with the stop 112.

To move from the disengaged position shown in FIG. 2B to the engaged position shown in FIG. 2A, the opposite considerations apply. The cam tip 212 makes initial contact with surface 200 of the concave opening and in so doing moves the pivot stage up to and just beyond the intermediate point of its arcuate travel, i.e., just beyond the point of maximum extension of spring 130. Then the tip of the cam disengages from surface 200. Depending on geometry, after a brief transition, it may then contact the opposing surface 202 of the concave opening as that surface is drawn into contact with the cam tip 212 by the spring 130, thereby slowing the spring induced motion of the pivot stage toward stop 114, until at the extreme of its arcuate travel the cam is disengaged from both surfaces 200–202, as shown in FIG. 2A, and the spring brings the pivot stage to rest against stop 114. Alternately, the geometry may be such that the cam makes no contact with surface 202, thereby avoiding any role in governing the rate at which the pivot stage is drawn by spring 130 into contact with the stop 114.

FIG. 3A is an exploded isometric top side view of the multi-position optic mount shown in FIG. 1B. The cam 140, pivot stage 124, kinematic stage 120, and housing 110 are shown. The housing also defines a first opening into which a bearing 310 is placed. That bearing accommodates a proximal end of dowel 312 and allows that dowel to rotate within the opening. The distal end of the dowel is anchored in the opening 126 of the pivot stage. Thus, the pivot stage rotates about a rotation axis defined by the centerline of dowel 312 and bearing 310. The housing also defines a second opening through which extends the output shaft 300 of motor 102. The end of the output shaft is coupled to the cam 140 at opening 210. At its tip 212, a pin 330 on the cam mates with a hardened cylindrical bearing, or needle bearing which is the point of contact between the cam and the surfaces of the concave opening.

FIG. 3B is an enlarged exploded top side view of the kinematic mount shown in FIG. 3A. The pivot stage 124 and kinematic stage are shown. The kinematic stage includes kinematic contact points 350–354. Kinematic contact point 352 is a conically shaped detent which provides three points of contact with the ball bearing 360 that is part of the pivot stage. Contact point 354 is a "V" shaped slotted detent which provides two points of contact with the hemispherical tip of an adjustment screw 376 which threads through a threaded opening in the pivot stage. Contact point 350 is a flat bottom detent which provides a single point of contact for the hemispherical tip of adjustment screw 374 which threads through a threaded opening in the pivot stage. The pivot and kinematic stages are drawn towards one another by means of springs 378 which are coupled to the stages at opposing ends by means of anchor pins 370–372. Within the kinematic stage, an opening is defined in which the optic element 122 is held. The kinematic mount provides six points of contact and precise adjustment on the x and y axis of the optic element.

Figure 4B:
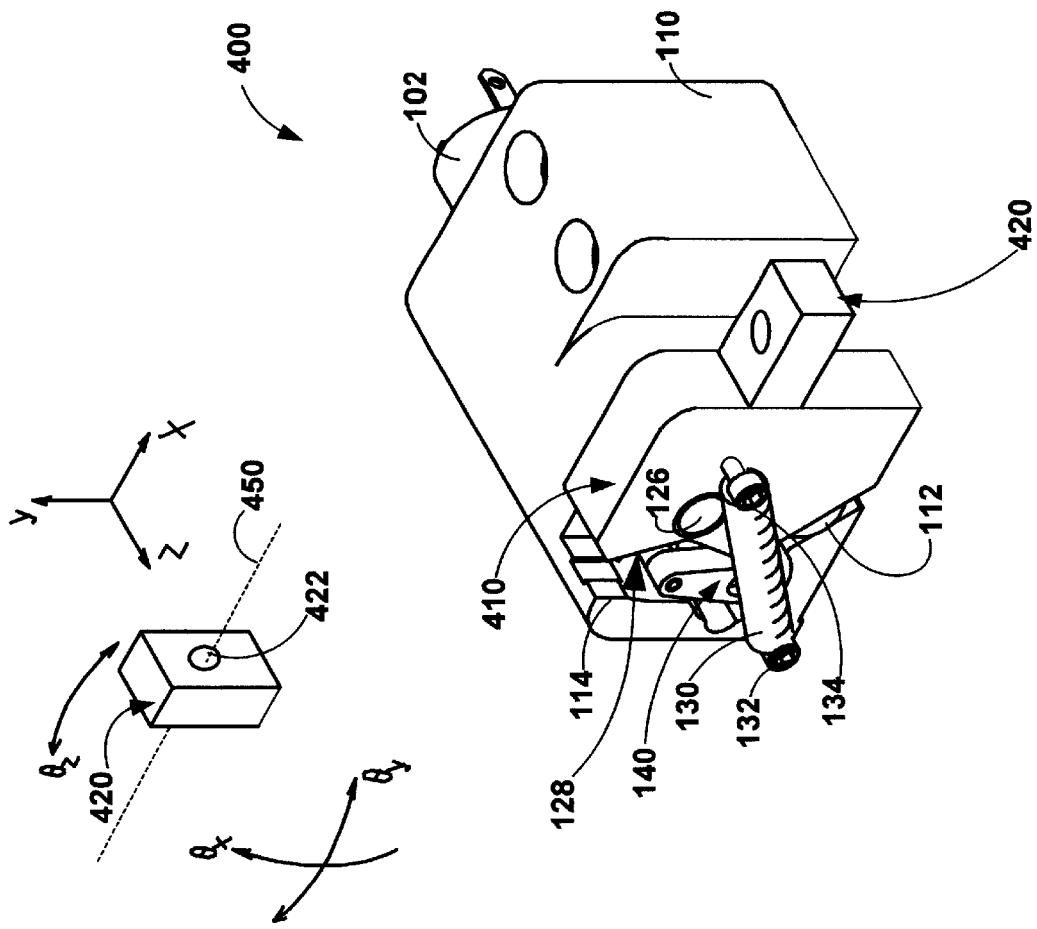
FIGS. 4A–B are isometric top side views of the multi-position optic mount shown in FIGS. 1A–B respectively with a different optical element than that shown in FIGS. 1A–B.
Figure 4A:
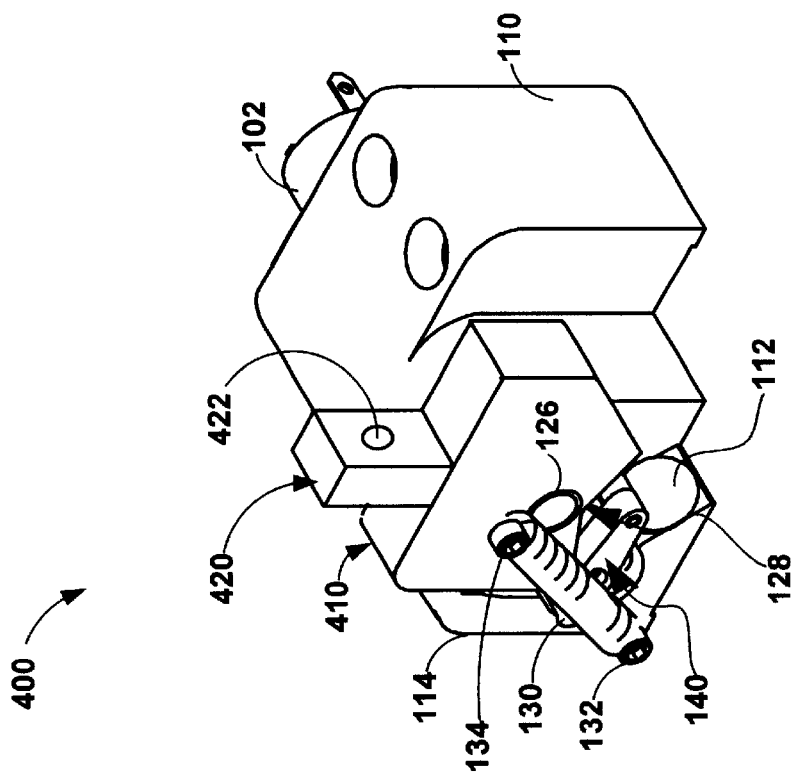

FIGS. 4A–B are isometric top side views of the multi-position optic mount shown in FIGS. 1A–B, respectively, with a different optical element than that shown in FIGS. 1A–B. In this embodiment the optic element is a block 420 with a pinhole 422. The block is shown coupled to the pivot stage 410. FIG. 4A shows the pinhole in the engaged position aligned with the optic axis 450. FIG. 4B shows the pinhole in the disengaged position avoiding the optic axis. The axis of the pinhole, i.e., the optic axis, in the engaged position lies tangent to the arc circumscribed by the pivot stage and parallel with the x axis. This is in contrast to the embodiment shown in FIGS. 1–3, in which the normal to the optic element or the optic axis of that element 122 was normal to the plane in which the pivot stage rotated, i.e., the x-y plane and parallel with the z axis. The choice of alignment between the optic element and the rotation plane of the pivot stage is based on a determination as to which of the axes of the optic element require the greatest precision of alignment with the optical axis. For the lens, filter, or mirror 122 shown in FIGS. 1–3, the most sensitive axes are the tip (theta x) and tilt (theta y) of the lens/filter/mirror. These axes are aligned with the rotation plane of the pivot stage, e.g., the x-y plane. For the pinhole, by contrast, the most sensitive axis (theta z) is placed in the rotation plane of the pivot stage, e.g., the x-y plane.

FIGS. 5–6 show an alternate embodiment of the invention in which an active and passive actuator linearly translate a moveable stage between an engaged and a disengaged position. FIGS. 5A–C show the moveable stage at respectively the engaged position, an intermediate position, and the disengaged position. FIGS. 5D–E are isometric side views of the base and actuator alone without the moveable stage.

In FIGS. 5A–C a base 502 with a proximal end 504 and a distal end 506 is shown. Affixed to the proximal end of the base is an actuator 520 with a plunger 522 extensible along the base. At the terminus of the plunger a pin 524 is affixed. The pin extends orthogonally from the plunger to engage a longitudinal slot 514 defined within a moveable stage 512. The optic element 516 is held within an opening defined in the movable stage and moves linearly with that stage. Affixed to a lower portion of the moveable stage is a linear bearing member 510. That linear bearing member slidably engages a corresponding track 508 affixed to, or in an alternate embodiment, defined by the base 502. Mounted to the proximal end of the base 504 and the distal end of the base 506 are passive actuators, e.g., magnet 530–532 respectively. These magnets act magnetically on the moveable stage 512 which, in the embodiment shown, is made up of a ferro-magnetic material. The movable stage is brought into the range of, though not contact with, either magnet by the active actuator. The movement of the active actuator terminates and the remaining movement of the movable stage into contact with either magnet is brought about solely by the attractive force of the corresponding magnet.

The initial movement of the moveable stage away from the proximal end is accomplished by contact between pin 524 and the distal edge of the slot 514. The actuator drives the pin against the distal end of the slot. The plunger moves the pin and movable stage toward the distal end of the base and into the range at which the attractive force between magnet 532 is sufficient to overcome the friction associated with the movement of the linear bearing 510 along the track 508. It is at this point that the actuator motion terminates with the remaining movement brought about by the freedom provided by the slot and the attractive force between the magnet 532 and the movable stage. In an alternate embodiment of the invention the pin is rigidly, rather than slidably affixed to the movable stage. In this embodiment none of the "slop" provided by the slot is available. In this embodiment, the plunger traverses the entire distance between the engaged and disengaged positions. To retain the dual, active and passive actuator characteristics discussed above, the actuator is electrically disengaged prior to reaching either extreme of travel with the remaining movement provided by the attractive force between the corresponding magnet and the movable stage.

FIGS. 5D–E are isometric side views showing the details of the actuator 520, piston 522 and draw pin 524 as well as the location of the magnets 530–532.

FIG. 6A is an exploded isometric top side view of another linear embodiment of the multi-position optic mount in which the passive actuator is a compression spring rather than a pair of magnets. FIGS. 6B–D are isometric top side views of the linear embodiment of the multi-position optic mount of FIG. 6A, showing movement of the optic element between the disengaged position and the engaged position. The compression spring accomplishes the final movement of the moveable stage 512, toward either the proximal end 504 or the distal end 506 of the base. The spring 602 is affixed at a first end to a linear bearing 510. At a second opposing end, the spring is affixed to a pin 604 which is in turn affixed to the base 502. The geometry is such that in the intermediate position shown in FIG. 6C the first stage has a higher potential energy with the spring at maximum compression than is the case at either the disengaged or engaged positions of the movable stage shown in FIG. 6B,D respectively.

Although each of the embodiments discussed above have utilized a motor and cam for the active actuator and an extension spring for the passive actuator, other embodiments of the invention may be implemented without departing from the scope of the claims.

In an alternate embodiment of the invention the passive actuator includes: torsion springs, leaf springs, etc. In still other embodiments of the invention the passive actuator includes: magnets, energized coils, or other attractive members. The magnets are located at either stop. Their attractive force operates on the pivot stage to draw it into contact with either stop. In embodiments of the invention which utilize magnets, a potential energy minimum exists when the pivot stage is in contact with either magnet/stop and a potential energy maximum exists when the pivot stage is intermediate the stops. In still other embodiments of the invention, the passive actuator includes: static charges of opposing polarity on the stop and pivot stage, a vacuum generator, such as a suction cup at each stop, and an orientation of the stops and pivot stage which results in a minimum of gravitational potential energy at each stop and a maximum intermediate the stops.

In still other embodiments of the invention the active actuators may generate rotary or linear motion. Rotary actuators may include: DC/AC motors, stepper motors, hydraulic motors, pneumatic motors, rotary solenoids, voice coils, shape memory motors, etc. In embodiments of the invention where a linear actuator is utilized, the actuator could couple directly to either the cam or the pivot stage along a line tangent to the arc circumscribed by the corresponding one of the cam or pivot stage. Alternately, an intermediate coupling, such as a crank, could be used to transform the linear movement of the linear actuator into arcuate motion. Linear actuators may include: linear motors, solenoids, pneumatic and hydraulic pistons, voice-coils, cable releases, etc.

In still other embodiments of the invention different coupling mechanisms may be utilized in place of the cam, including: cranks, gears, or magnets.

In another embodiment of the invention the pivot stage may be directly driven, as opposed to being driven by the cam. In this embodiment of the invention, the pivot stage is actively driven by the active actuator only from a respective stop up to and beyond the intermediate point with the remaining part of the travel to the selected stop accomplished by the passive actuator and with the motor disengaged or de-energized during this second, or passive activation phase.

In still other embodiments of the invention there are more than two stops, i.e., a plurality of stops.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A mount for positioning an optic element in at least a first and a second position; and the mount for positioning comprising:

a base;

a movable stage for holding the optic element, and the movable stage coupled to the base and positionable in at least a first and a second position;

an active actuator coupled to the movable stage to move the movable stage from the first position toward the second position and from the second position toward the first position; and a passive actuator to complete the movement of the movable stage to the corresponding one of the first position and the second position.

2. The mount of claim 1, wherein the movable stage couples pivotally with the base and moves arcuately from the first to the second position.

3. The mount of claim 1, wherein the movable stage couples slidably with the base and moves linearly from the first to the second position.

4. The mount of claim 2, wherein the active actuator includes:

a motor with a rotary output shaft, and the motor coupled to the base and the output shaft coupled to the pivot stage.

5. The mount of claim 2, wherein the active actuator includes:

a motor with an output shaft, and the motor coupled to the base; and a cam coupled to the output shaft, and oriented to arcuately move the movable stage from the first position toward the second position and from the second position toward the first position.

6. The mount of claim 3, wherein the active actuator includes:

a extensible plunger coupled to the movable stage to translate the movable from the first position toward the second position and from the second position toward the first position.

7. The mount of claim 1, wherein the active actuator includes at least one of a linear actuator and a rotary actuator.

8. The mount of claim 1, wherein the passive actuator includes:

an extension spring with a proximal and a distal end, and the proximal end anchored to the base, and the distal end anchored to the pivot stage at a location beyond the pivot point to generate regions of low potential energy in the pivot stage at both the first position and the second position, and to generate a region of high potential energy intermediate the first and the second position.

9. The mount of claim 1, wherein the passive actuator includes:

a compression spring with a proximal and a distal end, and the proximal end anchored to the base, and the distal end anchored to the pivot stage at a location between the pivot point and the proximal end to generate regions of low potential energy in the pivot stage at both the first position and the second position, and to generate a region of high potential energy intermediate the first and the second position.

10. The mount of claim 2, wherein the base defines a first stop and a second stop arcuately displaced from one another, and a contact between the first stop and the movable stage defining the first position and the contact between the second stop and the movable stage defining the second position.

11. The mount of claim 1, wherein the passive actuator generates regions of low potential energy in the pivot stage at both the first position and the second position, and generates a region of high potential energy intermediate the first and the second position.

12. The mount of claim 11, wherein the passive actuator includes at least one of: springs; magnets; energized coils; static charges of opposing polarity on the stop and pivot stage; a vacuum generator, such as a suction cup at each stop; and an orientation of the stops and pivot stage which results in a minimum of gravitational potential energy at each stop and a maximum intermediate the stops.

13. A mount for positioning an optic element in at least a first and a second position; and the mount for positioning comprising:

a base;

a movable stage for holding the optic element and the movable stage coupled to the base and positionable in a least a first and a second position;

an active actuator coupled to the movable stage to move the movable stage from the first position toward the second position and from the second position toward the first position; and a passive actuator coupled to the movable stage to complete the movement of the movable stage to the corresponding one of the first position and the second position by generating regions of low potential energy for the movable stage at the first and second position and a region of high potential energy intermediate the first and second position.

14. The mount of claim 13, wherein the passive actuator includes at least one of: a mechanical coupling, a static electric coupling, a gravitational coupling, and a magnetic coupling to the movable stage.

15. The mount of claim 13, wherein the active actuator includes:

a motor with an output shaft, and the motor coupled to the base and the output shaft coupled to the movable stage.

16. The mount of claim 13, wherein the active actuator includes:

a motor with an output shaft and the motor coupled to the base;

a cam coupled to the output shaft, and oriented to move the movable stage from the first position toward the second position and from the second position toward the first position.

17. The mount of claim 13, wherein the active actuator includes at least one of a linear actuator and a rotary actuator.

18. The mount of claim 13, wherein the passive actuator includes:

an extension spring with a proximal and a distal end, and the proximal end anchored to the base, and the distal end anchored to the movable stage at a location beyond a pivot point of the movable stage to generate regions of low potential energy in the movable stage at both the first position and the second position, and to generate a region of high potential energy intermediate the first and the second position.

19. The mount of claim 13, wherein the passive actuator includes:

a compression spring with a proximal and a distal end, and the proximal end of said compression spring anchored to the base, and the distal end anchored to the movable stage at a location between a pivot point of the movable stage and the proximal end of said compression spring to generate regions of low potential energy in the pivot stage at both the first position and the second position, and to generate a region of high potential energy intermediate the first and the second position.

20. The mount of claim 13, wherein the base defines a first stop and a second stop arcuately displaced from one another, and a contact between the first stop and the movable stage defining the first position and the contact between the second stop and the movable stage defining the second position.

21. The mount of claim 13, wherein the passive actuator includes at least one of: springs; magnets; energized coils; static charges of opposing polarity on the stop and movable stage; a vacuum generator, such as a suction cup at each stop; and an orientation of the stops and movable stage which results in a minimum of gravitational potential energy at each stop and a maximum intermediate the stops.

22. A mount for positioning an optic element in at least a first and a second position; and the mount for positioning comprising:

a base;

means for holding the optic element, and the means for holding coupled to the base and positionable in at least a first and a second position;

an active activation means coupled to the means for holding to move the means for holding from the first position toward the second position and from the second position toward the first position; and a passive activation means to complete the movement of the means for holding to the corresponding one of the first position and the second position.

23. A mount for positioning an optic element in at least a first and a second position; and the mount for positioning comprising:

a base;

means for holding the optic element, and the means for holding coupled to the base and positionable in at least a first and a second position;

an active activation means coupled to the means for holding to move the means for holding from the first position toward the second position and from the second position toward the first position; and a passive activation means coupled to the means for holding to complete the movement of the means for holding to the corresponding one of the first position and the second position by generating regions of low potential energy for the pivot stage at the first and second position and a region of high potential energy intermediate the first and second position.

* * * * *